(12) United States Patent
Johnson

(10) Patent No.: US 6,385,817 B1
(45) Date of Patent: May 14, 2002

(54) DRYING SLEEVE FOR A SPORTS EQUIPMENT HANDLE

(76) Inventor: Ron D. Johnson, 1851 Gibbs Shoals Rd., Greer, SC (US) 29650

( * ) Notice: Subject to any disclaimer, the term of this patent is extended or adjusted under 35 U.S.C. 154(b) by 0 days.

(21) Appl. No.: 09/794,273

(22) Filed: Feb. 27, 2001

(51) Int. Cl.[7] .............................. A45C 13/22; B25G 3/00
(52) U.S. Cl. .............................. 16/431; 16/435; 16/422; 16/904; 15/208; 15/244.4; 15/230.15
(58) Field of Search .......................... 16/431, 435, 422, 16/904, DIG. 12; 294/25, 171; 2/20, 158–160; 38/95; 379/452; 473/300–303, 549, 551; 15/104.94, 227, 208, 238, 210.1, 244.1, 244.4, 230.15

(56) References Cited

U.S. PATENT DOCUMENTS

| | | | |
|---|---|---|---|
| 2,701,361 A | * | 2/1955 | Depta, Jr. ..................... 16/435 |
| 4,071,921 A | * | 2/1978 | Jury ............................. 15/227 |
| 4,662,415 A | | 5/1987 | Proutt |
| 4,959,881 A | * | 10/1990 | Murray ..................... 15/104.94 |
| 5,079,792 A | * | 1/1992 | D'Haen ........................ 15/227 |
| 5,196,244 A | * | 3/1993 | Beck ...................... 128/200.24 |
| 5,203,390 A | | 4/1993 | Eckstein |
| 5,377,378 A | * | 1/1995 | Cutler ........................... 15/227 |
| 5,378,529 A | * | 1/1995 | Bourdeau ...................... 2/159 |
| 5,398,424 A | | 3/1995 | Corcoran |
| 5,511,445 A | * | 4/1996 | Hildebrandt ................. 16/421 |
| 5,791,008 A | * | 8/1998 | Crabtree ..................... 15/209.1 |
| 5,860,190 A | * | 1/1999 | Cano ............................ 16/422 |

* cited by examiner

Primary Examiner—Chuck Y. Mah
(74) Attorney, Agent, or Firm—Dority & Manning, P.A.

(57) ABSTRACT

A drying sleeve is provided for a handle, such as a sports equipment handle. The drying sleeve has an open end, a closed end and an inner surface that define a cavity. An absorbent material and a containment material cover the majority of the inner surface to permit insertion and drying of the handle. A substantially moisture-proof outer cover covers the sleeve.

17 Claims, 5 Drawing Sheets

DRYING SLEEVE FOR A SPORTS EQUIPMENT HANDLE

FIELD OF THE INVENTION

The invention relates generally to a drying instrument for handles. More particularly, the invention relates to a drying sleeve for handles for use out of doors and especially in inclement weather where the handle is subject to unwanted moisture.

BACKGROUND OF THE INVENTION

Various inventions have been developed for drying and keeping dry handles of various articles, such as sports equipment.

The common towel is known for drying sports equipment or other outdoor equipment handles. One drawback of the towel is that in inclement weather the towel becomes quickly saturated and ineffective for drying. Towels stored inside waterproof containers are also known. However, such towels are usually inconvenient to remove from a tightly-packed configuration to make ready for use. Towels stored in rain-proof covers are also known. For example, a folded towel configuration in a rain-proof covering is shown in U.S. Pat. No. 5,398,424. However, this device is cumbersome, heavier and bulkier than preferable and is further subject to snagging on a handle.

OBJECTIVE AND SUMMARY OF THE INVENTION

Accordingly, it is an objective of the present invention to provide a drying sleeve, wherein the component parts of the drying sleeve are simple and economical to manufacture, assemble, and use. Other objectives and advantages of the invention will be apparent from the following description and the attached drawings or can be learned through practice of the invention.

According to the invention, a moisture-proof, handheld drying sleeve for drying handles in inclement weather or due to moisture from a user's hand is provided.

The sleeve incorporates a substantially moisture-proof outer cover that covers the drying sleeve, and a member with a closed end and an open end with an opening to receive the handle to be dried. The handle contacts an absorbent material which covers a substantial part of the inner surface of the drying sleeve. A containment material overlays the absorbent material to prevent snagging and to smoothly guide the handle toward the closed end of the drying sleeve. After insertion of the handle within the sleeve, the drying sleeve is compressed and the absorbent material substantially envelopes the handle to dry moisture.

BRIEF DESCRIPTION OF THE DRAWINGS

The above and other aspects, advantages and objectives of the present invention are apparent from the detailed description below in combination with the drawings in which:

FIG. 2 is an end view of the drying sleeve taken along line II—II is FIG. 1a;

FIG. 3 is a sectional view of the drying sleeve in FIG. 1 taken along line III—III in FIG. 1a;

FIG. 5 is a perspective view of point-bearing surfaces taken at Area V of FIG. 4a.

Figure 1:
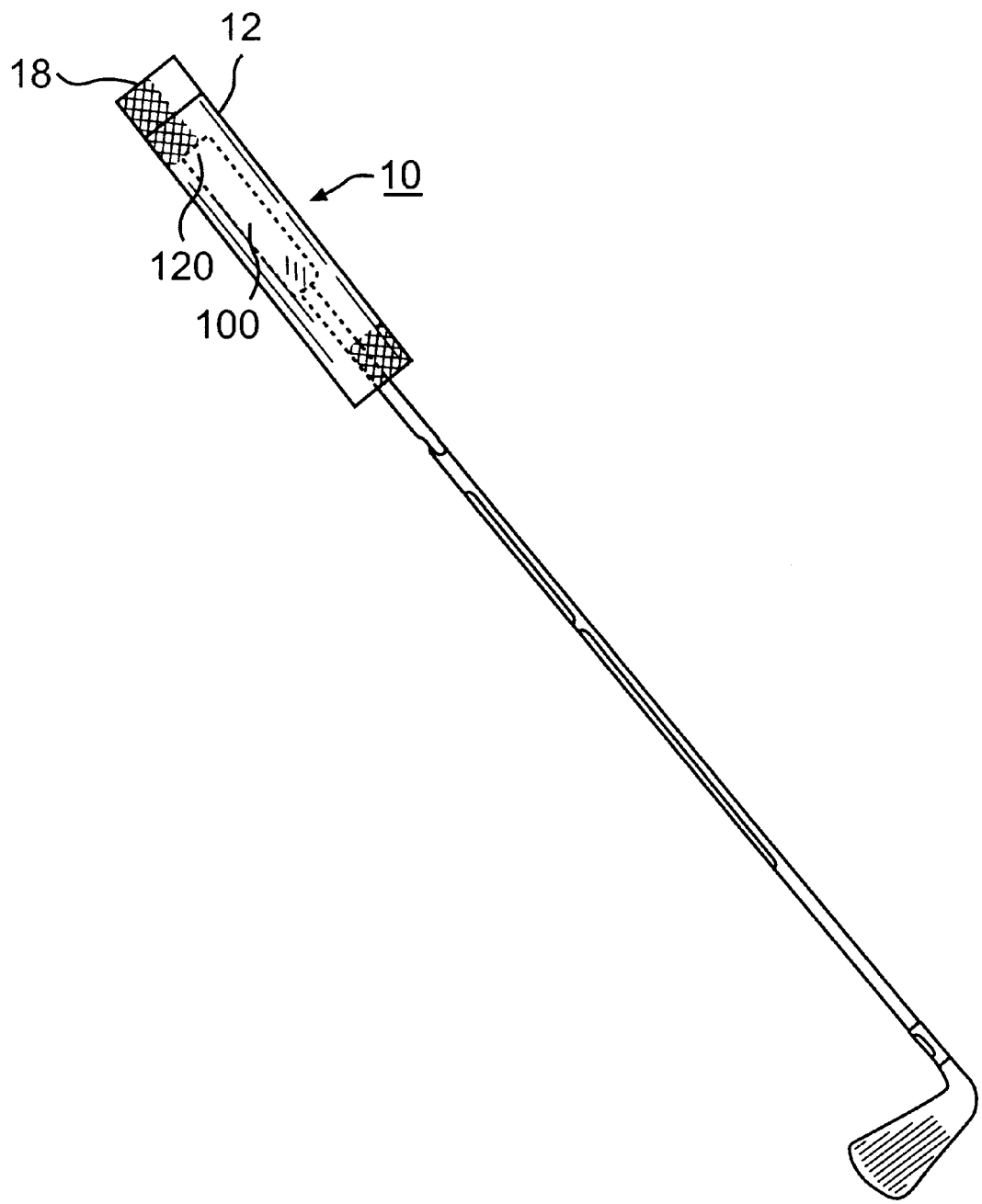
FIG. 1 is a perspective view of a golf club incorporating a drying sleeve according to the invention.
Figure 1A:
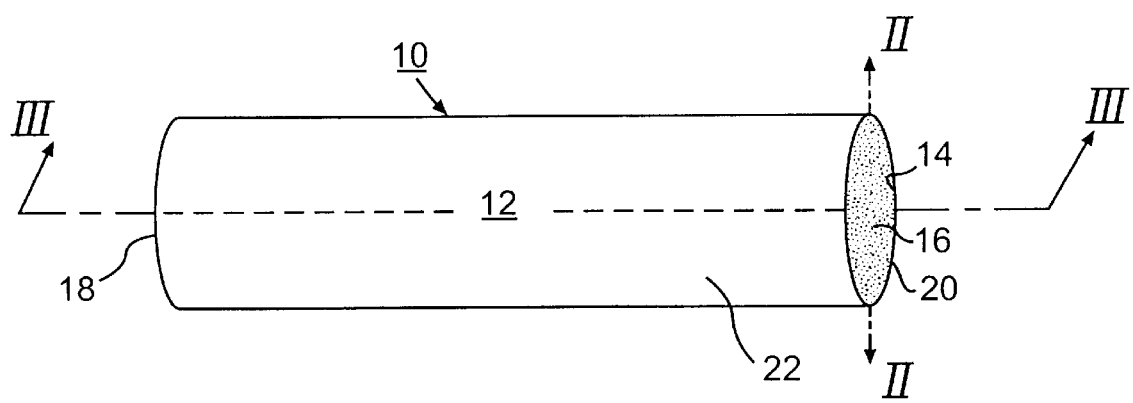
FIG. 1a is a side view of the drying sleeve including an opening.

Repeat use of reference characters in the present specification and drawings is intended to represent same or analogous features or elements of the invention.

DETAILED DESCRIPTION OF THE DRAWINGS

Detailed reference will now be made to the drawings in which examples embodying the present invention are shown. The examples set forth in the drawings and detailed description are provided by way of explanation of the invention and are not meant as a limitation of the invention. It is intended that the present invention include modifications and variations of the following examples as come within the scope of the appended claims and their equivalents.

Figure 2:
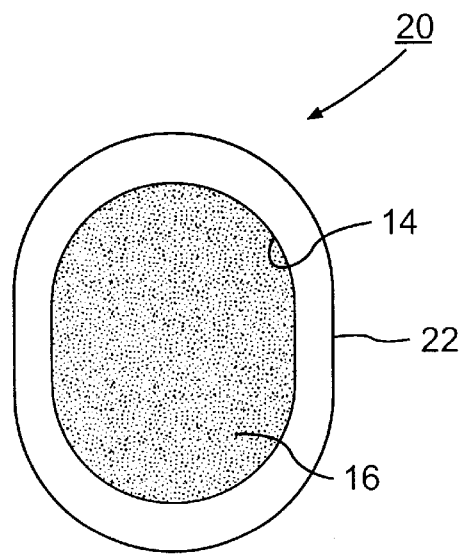

As broadly embodied in FIGS. 1–2, a drying sleeve 10 for drying a handle 100 is provided. The drying sleeve 10 has a pliable elongated member 12 with an inner surface 14 defining a cavity 16, the member 12 having a closed end 18 and an open end 20 configured to receive a handle for drying, such as the handle 100 of a golf club, as seen in FIG. 1. Although the sleeve 10 will be described herein with reference to a sports equipment handle, particularly a golf club, it should be appreciated that the present sleeve has utility for any type of article having a handle that is preferably kept dry.

FIG. 1 further shows a substantially moisture-proof outer cover 22, for example a vinyl or other moisture proof material. Preferably, the moisture-proof material of the outer cover 22 can be embossed, for example, to display a company's logo. FIG. 2 shows the inner surface 14 and cavity 16 of the substantially circular or oval open end 20 of the drying sleeve 10.

Figure 3:
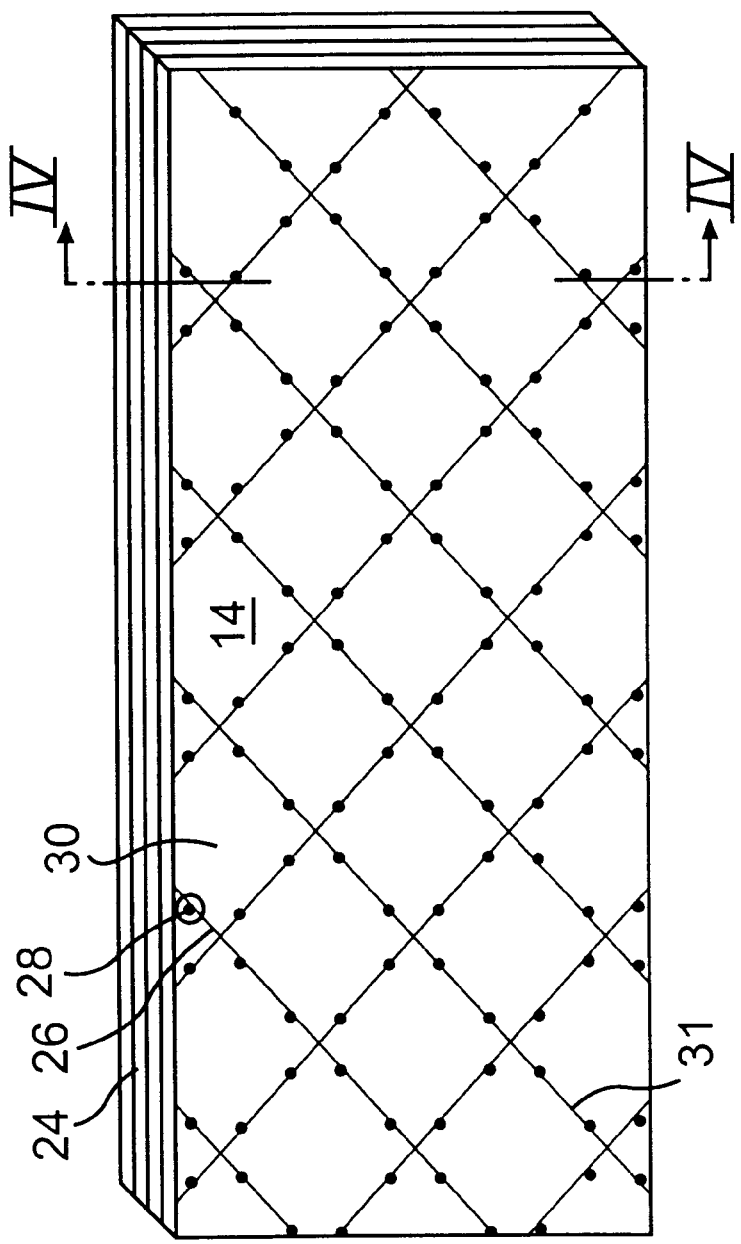

According to one embodiment of the invention, the inner surface 14 particularly shown in FIG. 3, substantially covers the inside of the member 12. The inner surface 14 includes absorbent material 24 and containment material 26. The containment material 26 has point-bearing surfaces 28, and contains openings 30 which present a substantial majority of the absorbent material 24 to the surface of a handle 100. The containment material can be affixed to the absorbent material by various methods, for example, sewing. Together, the containment material 26, point-bearing surfaces 28, and openings 30 form a grid-like net 31. Further, the net 31 may be a durable plastic composition.

In use, the handle 100 is inserted in the cavity 16 through the open end 20 to contact the containment material 26 and point-bearing surfaces 28. Continued insertion of the handle 100 terminates when an end 120 of the handle 100 contacts the closed end 18. Compression of the drying sleeve 10 permits the absorbent material 24 to contact the handle 100 via openings 30 whereby moisture is absorbed by the absorbent material 24.

Figure 4A:
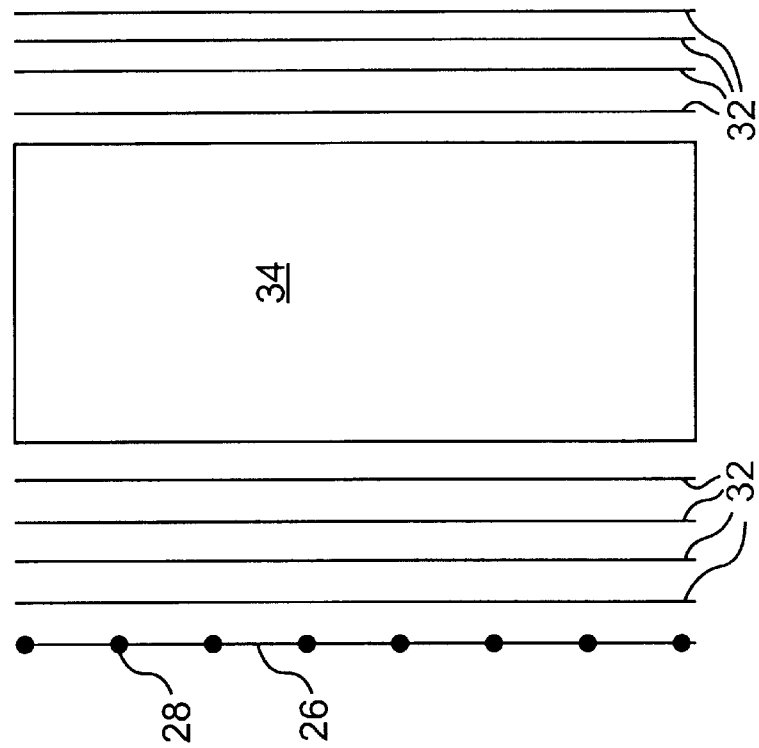
FIG. 4a is a sectional view of the absorbent material in FIG. 3 taken along line IV—IV in FIG. 3.
Figure 4B:
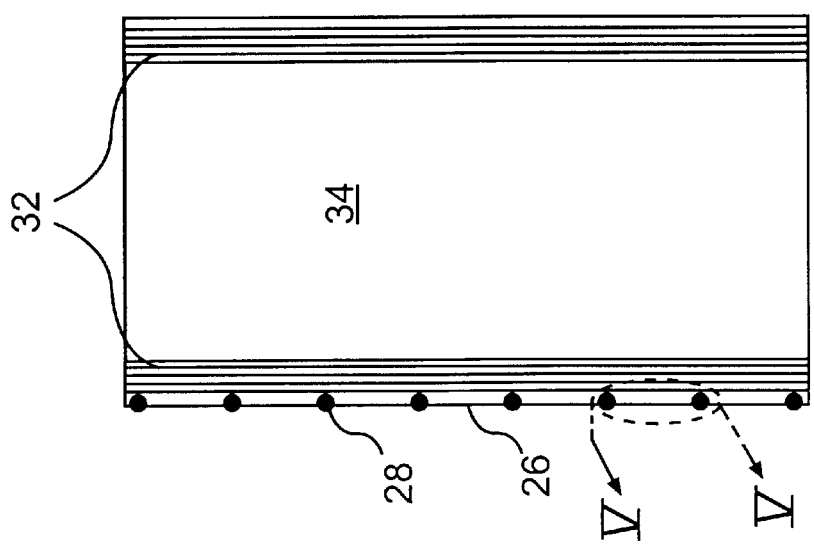
FIG. 4b is an exploded view of one embodiment of absorbent material taken along line IV—IV in FIG. 3.

FIGS. 4a and 4b particularly show the components of the absorbent material 24 and the containment material 26 according to one embodiment of the invention. By way of example, an absorbent paper 32 may be disposed on either side of a mat 34 which may be, for instance, bleached cotton, fiber or similar material. Further, the absorbent paper 32 may be an absorbent pulp layer, for example, on either side of the mat 34, as shown in the exploded view of FIG. 4b. Alternatively, only absorbent paper 32 or only a mat 34 may be used as absorbent material 24. The pulp layer may be a plurality of layers such as a four-ply layer of absorbent paper 32. After moisture is absorbed by the absorbent material 24, the material 24 may subsequently dry via the openings 30 and the sleeve 10 for future use.

Figure 5:
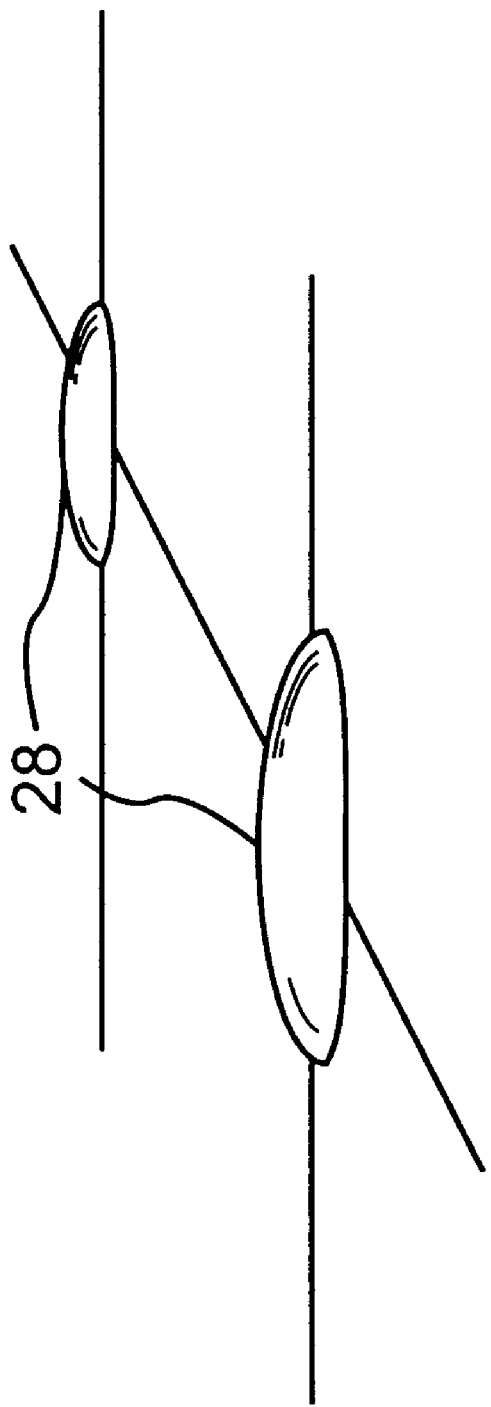

FIG. 5 illustrates the point-bearing surfaces 28 taken from a perspective Area V of FIG. 4a. The point-bearing surfaces 28 may be substantially circular in planar cross-section with a center point and a maximum elevation at the center point such that the elevation of the point-bearing surfaces 28 decreases radially away from the center point. The handle 100, inserted toward the closed end 18 of the drying sleeve 10, is elevated by the point-bearing surfaces 28 above the absorbent material 24 at the area surrounding the point-bearing surfaces 28 sufficiently to prevent handle snagging and to aid in sliding the sleeve onto and off of the handle 100. However, the minimal elevation of the point-bearing surfaces permits the absorbent material to contact and absorb moisture from the handle at the remaining areas of the inner surface 14. In one embodiment, to assist with preferable handle fit and moisture absorption, the member 12 may have, for example, a larger open end 20 relative to a smaller closed end 18 to dry the handle.

Those skilled in the art will recognize that other changes and modifications may be made to the embodiments of the invention described herein without departing from the spirit of the invention. It is intended to claim all such changes and modifications as fall within the true scope of the invention.

What is claimed is:

1. A drying sleeve for a handle, the sleeve comprising:
    an elongated member having an inner surface that defines a cavity therein, the member having a closed end and an opposing open end configured to receive an end of the handle;
    the elongated member having a substantially moisture-proof outer cover;
    an absorbent material defining a substantial majority of the inner surface, the absorbent material configured for absorbing moisture; and
    a containment material in fixed, overlying communication with the absorbent material, the containment material having a plurality of point-bearing surfaces and openings therein, the openings configured to permit moisture transfer to the absorbent material, the point-bearing surfaces configured to permit unimpeded insertion and removal of the handle from the cavity.

2. The drying sleeve as in claim 1, wherein the outer cover is embossable.

3. The drying sleeve as in claim 1, wherein the absorbent material is an absorbent pulp layer.

4. The drying sleeve as in claim 3, wherein the absorbent pulp layer is a plurality of absorbent papers.

5. The drying sleeve as in claim 3, wherein the absorbent material further comprises a mat.

6. The drying sleeve as in claim 5, wherein the mat is bleached cotton.

7. The drying sleeve as in claim 1, wherein the absorbent material is a mat having a first side and a second side, and further comprising a first absorbent pulp layer in communication with the first side and a second absorbent pulp layer in communication with the second side.

8. The drying sleeve as in claim 1, wherein the containment material comprises a net.

9. The drying sleeve as in claim 8, wherein the net is plastic.

10. The drying sleeve as in claim 8, wherein the net defines the containment material openings, the openings sufficiently large to permit absorption of moisture through to the absorbent material and subsequent drying of the absorbent material.

11. The drying sleeve as in claim 8, wherein the net is a grid-like net, the grid having substantially less surface area than the underlying absorbent material.

12. The drying sleeve as in claim 1, wherein the point-bearing surfaces have a substantially circular, planar cross-section and define an elevated body with a center point having a maximum elevation substantially at its center point, the elevation decreasing radially in a direction away from the center point.

13. The drying sleeve as in claim 1, wherein the elongated member is pliable.

14. A drying sleeve for a handle, the sleeve comprising:
    a pliable, elongated member having an inner surface that defines a cavity therein, the member having a closed end and an opposing open end configured to receive an end of the handle;
    a substantially waterproof outer cover covering the member;
    an absorbent material at least partially comprising cotton, the absorbent material covering a substantial majority of the inner surface; and
    a grid-like containment net in fixed, overlying communication with the absorbent material, the net having a plurality of point-bearing surfaces and openings therethrough, the openings configured to permit moisture transfer to the absorbent material, the point-bearing surfaces configured to aid insertion and removal of the handle from the elongated member.

15. The drying sleeve as in claim 14, wherein the grid-like containment net has substantially less surface area than the underlying absorbent material.

16. The drying sleeve as in claim 14, wherein the point-bearing surfaces have substantially circular, planar cross-sections, and comprise an elevated body with a center point having a maximum elevation substantially at its center point, the elevation decreasing radially in a direction away from the center point.

17. The drying sleeve as in claim 14, wherein the closed end is smaller relative to the open end.

* * * * *